(No Model.) 2 Sheets—Sheet 1.
B. P. CLARK.
ANIMAL SHEARS.
No. 600,513. Patented Mar. 15, 1898.
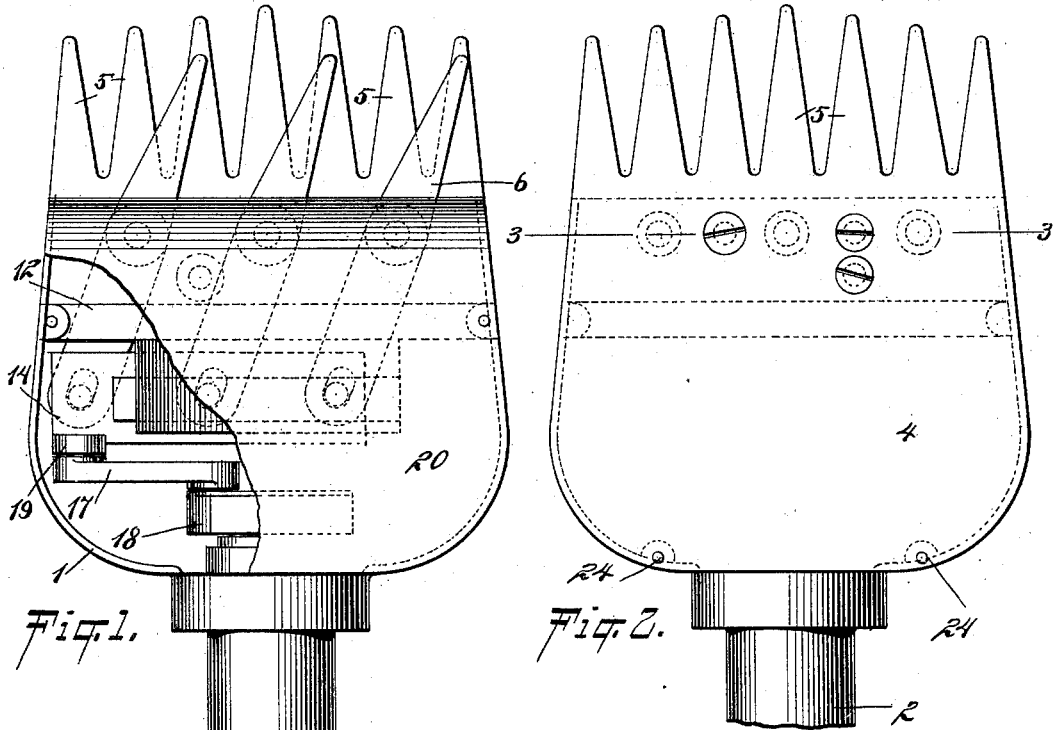
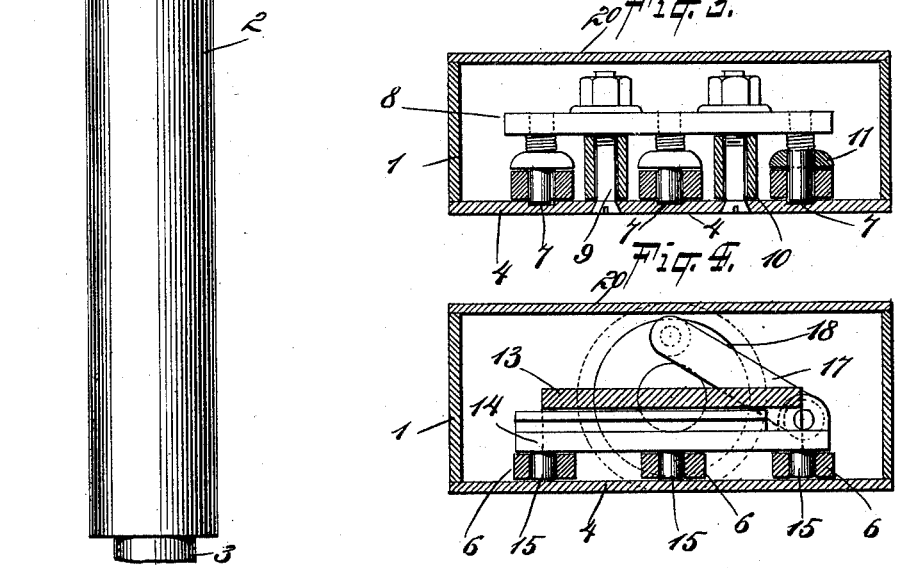
WITNESSES:
William P. Goebel
C. R. Ferguson
INVENTOR
B. P. Clark
BY
ATTORNEYS.
THE NORRIS PETERS CO., PHOTO-LITHO., WASHINGTON, D. C.

(No Model.) 2 Sheets—Sheet 2.
B. P. CLARK.
ANIMAL SHEARS.
No. 600,513. Patented Mar. 15, 1898.
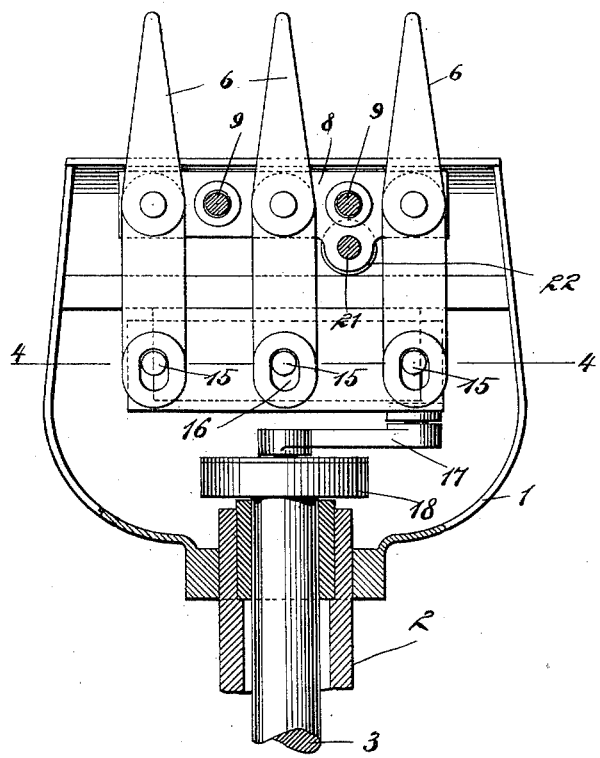
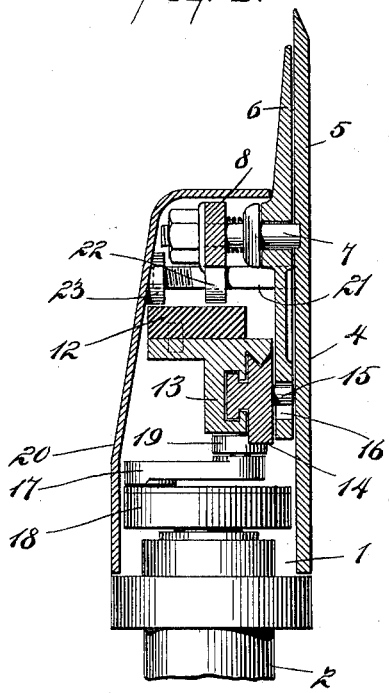
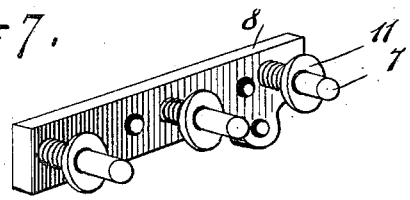
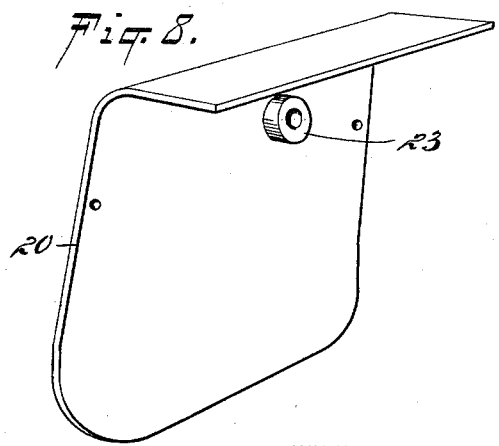
WITNESSES:
William P. Goebel.
C. R. Ferguson
INVENTOR
B. P. Clark
BY
ATTORNEYS.
THE NORRIS PETERS CO., PHOTO-LITHO., WASHINGTON, D. C.

UNITED STATES PATENT OFFICE.

BAINBRIDGE PERCY CLARK, OF CHOTEAU, MONTANA, ASSIGNOR TO WILLIAM MANICE AND AMEDIA S. CLARK, OF NEW YORK, N. Y.

ANIMAL-SHEARS.

SPECIFICATION forming part of Letters Patent No. 600,513, dated March 15, 1898.

Application filed July 14, 1897. Serial No. 644,567. (No model.)

*To all whom it may concern:*

Be it known that I, BAINBRIDGE PERCY CLARK, of Choteau, in the county of Teton and State of Montana, have invented new and useful Improvements in Animal-Shears, of which the following is a full, clear, and exact description.

My invention relates to shears, and is particularly adapted to the shearing of sheep; and it consists of certain novel parts and combinations of parts pointed out in the concluding claims.

In the accompanying drawings I have shown my invention applied in the form which is at present preferred by me, but it will be understood that various modifications and changes may be made in the device without departing from the spirit of my invention and without exceeding the scope of the concluding claims.

In the accompanying drawings, Figure 1 is a top plan view of shears embodying my invention. Fig. 2 is a bottom plan view. Fig. 3 is a section on the line 3 3, Fig. 2. Fig. 4 is a section on the line 4 4, Fig. 5. Fig. 5 is a partial section and partial plan view showing the interior mechanism. Fig. 6 is a longitudinal section. Fig. 7 is a perspective view of the fulcrum-plate employed. Fig. 8 is a perspective view of the removable cover.

The following is a description of the device illustrated in the drawings.

1 is a yoke or frame, open at its forward end and at its rear end attached to a tubular handle 2, in which a shaft 3 is mounted to rotate. This shaft 3 has a bearing at its inner end only in the tubular sleeve, and the outer end of said shaft is designed to be connected with a flexible shaft operated by a suitable motor in the usual manner.

Attached to the lower edge of the frame 1 is a bottom plate 4, having forwardly-extended fixed teeth 5. Cutter-blades 6 are mounted to move with a shear-like action over the teeth 5. As here shown, these cutter-blades are pivoted on pins 7. These pivot-pins 7 are connected to a pivot-bar 8, secured to the bottom plate 4 by means of screws 9. Sleeves 10 surround the screws, bearing at one end against the bottom plate and at the other end against the bar. These sleeves will cause said bar to be held rigidly in its position. The pivot-pins 7 are carried between the plate 4 and bar 8, and attached to each pivot-pin to bear upon the upper surface of a cutter-blade is a collar 11, controlled by spiral springs, as shown, which constantly hold the teeth up to their work.

Extended across the yoke or frame 1 is a bar 12, and to this bar 12 is secured a raceway 13 for a cutter-operating bar 14. The cutter-operating bar 14 is provided with pins 15, engaging with slots 16 in the lower ends of the cutter-blades. A reciprocating motion is imparted to the bar 14 by means of a pitman 17.

19 is a boss on the cutter-operating bar 14, to which the pitman 17 is pivoted.

23 is a boss on the inside of the cover 20, screw-threaded to receive the screw or bolt 21.

A cover 20 is secured to the upper edge of the frame 1, and at its forward end this cover 20 is turned downward and engages closely upon the cutter-blades just at or forward of their pivotal point. This will prevent the entrance of wool or hair. The bottom plate 4 and cover 20 are held in position by means of a screw 21. The bottom plate 4 is held from lateral movement relatively to the frame 1 by means of pins 24, extended from the frame into holes formed in said bottom plate, and the cover 20 is held from lateral movement in the same manner.

Among the many advantages possessed by the shears illustrated and described herein the following may be mentioned:

It will be observed that the shearing-teeth or cutting-blades are pivoted at or near the base of such blades, while the power is applied to the ends opposite the cutting ends. The advantage of such a construction over a shears in which the cutting-blades are pivoted at their lower ends and power is applied between the cutting ends and the pivots is very material. In my construction the inertia of the blades, which is very considerable, due to the speed at which they operate, is balanced to a greater or less extent, and thereby the annoying vibration characteristic of shears of this class heretofore employed is either eliminated or materially diminished.

In the next place the slots or openings in the upper part of the cover through which these teeth project are not nearly as large, and hence do not afford such ready access of wool or other foreign matter to the interior of the device as in the case where the blades are pivoted at their lower ends. I have shown the cover extending above the pivot-points, but by reducing the height of this cover and making it in line with the pivots no slots or openings need be left.

One of the difficulties encountered in shearing sheep, particularly those whose wool is heavy and greasy, is to keep the cutting-knives up to their work. The closer the pivot-point is to the cutting part the less spring of the metal is encountered and the more easily are the knives kept up to their work without relying upon guides or other devices which are not satisfactory in operation and produce unnecessary and destructive friction. Again, by pivoting the blades at the base of the cutting edges they are caused to oscillate in the arc of a smaller circle, which not only increases their power, but also more effectively applies the power employed. These and other advantages resulting from the manner in which the cutting-blades of my shears are mounted and operated might be pointed out, all of which are important in shears designed for shearing sheep and for analogous purposes where the ordinary shears of this general class cannot be successfully employed.

Difficulty has heretofore been encountered in preventing the pivots about which the knives oscillate being loosened or unscrewing in their supports. This difficulty I overcome by rigidly fixing the pivot-bar 8 to the base-plate 4 and securing the adjustment of the collars 11 by means which are independent of the devices supporting the pivot-bar. The collars 11, either by means of the spring shown or by any other suitable means, are adjustable to take up wear and to constantly and uniformly press the cutting-blades in contact with the edges of the stationary teeth.

In the foregoing specification I have incidentally referred to some of the modifications which might be adopted in the practice of my invention; but I have not endeavored to specify all the modifications which might be employed, the object of this specification being to instruct persons skilled in the art to practice the invention in the form at present preferred by me and to enable them to understand its nature, and I desire it to be distinctly understood that mention by me of a few modifications is in no way intended to exclude others not referred to, but which are within the spirit and scope of my invention.

Many of the details and combinations illustrated and above described are not essential to the several inventions broadly considered. All this will be indicated in the concluding claims, where the omission of an element or the omission of reference to the detail features of the elements mentioned is intended to be a formal declaration of the fact that the omitted elements or features are not essential to the inventions therein severally covered.

I claim—

1. In shears, the combination with an inclosing case of stationary teeth attached thereto, cutter-blades projecting therefrom pivoted in a plane at or near the forward side of said case, a reciprocating bar for actuating said cutter-blades and a track for said bar attached to said case.

2. In shears the combination of a yoke, a removable bottom plate provided with a series of teeth, a movable cover which together with the yoke and bottom plate forms a case for the working parts, pivoted cutter-blades, a reciprocating bar for actuating said cutter-blades and a track for said reciprocating bar rigidly attached to said yoke.

3. In a shears, the combination with the base-plate, of a pivot-bar rigidly but removably attached thereto, pivots on which the cutter-blades swing supported in said base-plate and pivot-bar, and collars adjustably supported on said pivots and bearing against said cutter-blades.

BAINBRIDGE PERCY CLARK.

Witnesses:
JNO. M. RITTER,
CHARLES A. MUNN.